United States Patent

Bury

[11] Patent Number: 5,125,163
[45] Date of Patent: Jun. 30, 1992

[54] SUPPORT STRUCTURES

[75] Inventor: James Bury, Allestree, United Kingdom

[73] Assignee: LK Limited, Derby, England

[21] Appl. No.: 576,511

[22] PCT Filed: Apr. 5, 1989

[86] PCT No.: PCT/GB89/00347
§ 371 Date: Oct. 5, 1990
§ 102(e) Date: Oct. 5, 1990

[87] PCT Pub. No.: WO89/09920
PCT Pub. Date: Oct. 19, 1989

[30] Foreign Application Priority Data

Apr. 8, 1990 [GB] United Kingdom ............... 8808281

[51] Int. Cl.$^5$ .............................................. G01B 5/03
[52] U.S. Cl. ................................. 33/573; 33/1 AA; 33/503
[58] Field of Search .............. 33/567, 1 AA, 573, 702, 33/DIG. 11, DIG. 19, 503

[56] References Cited

U.S. PATENT DOCUMENTS

| 326,925 | 9/1885 | Sundin | 33/567 |
| 2,336,506 | 12/1943 | Saunders | 33/567 |
| 4,250,396 | 2/1981 | Moeller | 33/1 AA |

FOREIGN PATENT DOCUMENTS

| 3325387 | 1/1985 | Fed. Rep. of Germany . |
| 3437196 | 5/1986 | Fed. Rep. of Germany . |
| 1271581 | 9/1961 | France . |
| 59-97823 | 6/1984 | Japan . |
| 2114924 | 9/1983 | United Kingdom . |
| 8302740 | 8/1983 | World Int. Prop. O. . |

OTHER PUBLICATIONS

Japanese Patent Abstract, vol. 8, No. 210 (M-238) (1647), Sep. 26, 1984.
Forest Products Journal, vol. 8, No. 7, Jul. 1958, A. O. Fiehl, "Reducing heat distortion in the knife and pressurebar assemblies of veneer lathes" pp. 216-218.

Primary Examiner—Harry N. Haroian
Attorney, Agent, or Firm—Frost & Jacobs

[57] ABSTRACT

In a co-ordinate measuring machine a guideway base is formed from tubular components 10-14 of a lightweight material. An electrically heated strip 16 is located centrally of the tubular elements and fans 18 are also provided within the base. The strip 16 and the fans 18 can maintain the temperature of the base structure at a constant level at or above the ambient temperature so that changes in the latter do not result in any thermal expansion of the material of the base structure.

18 Claims, 2 Drawing Sheets

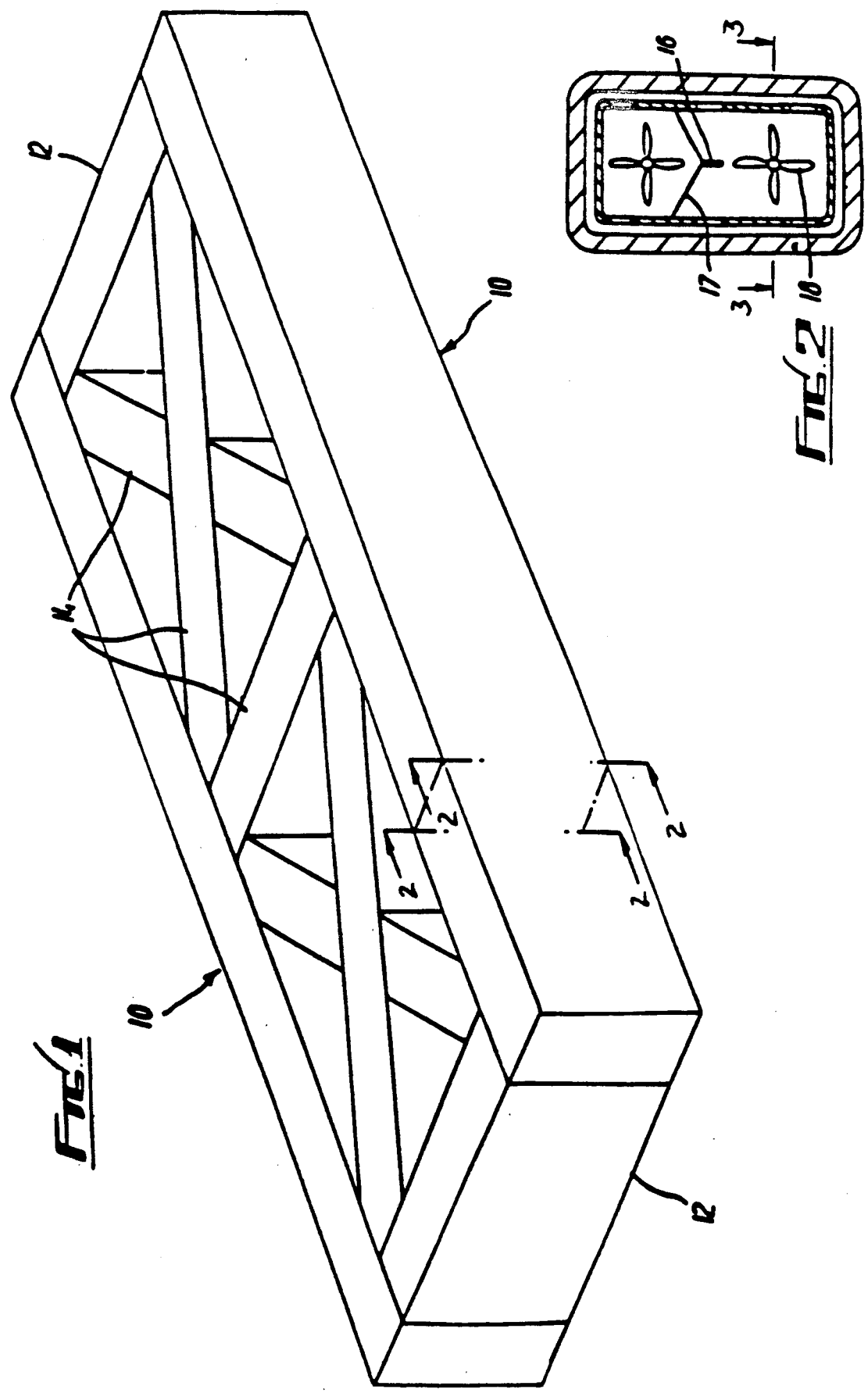

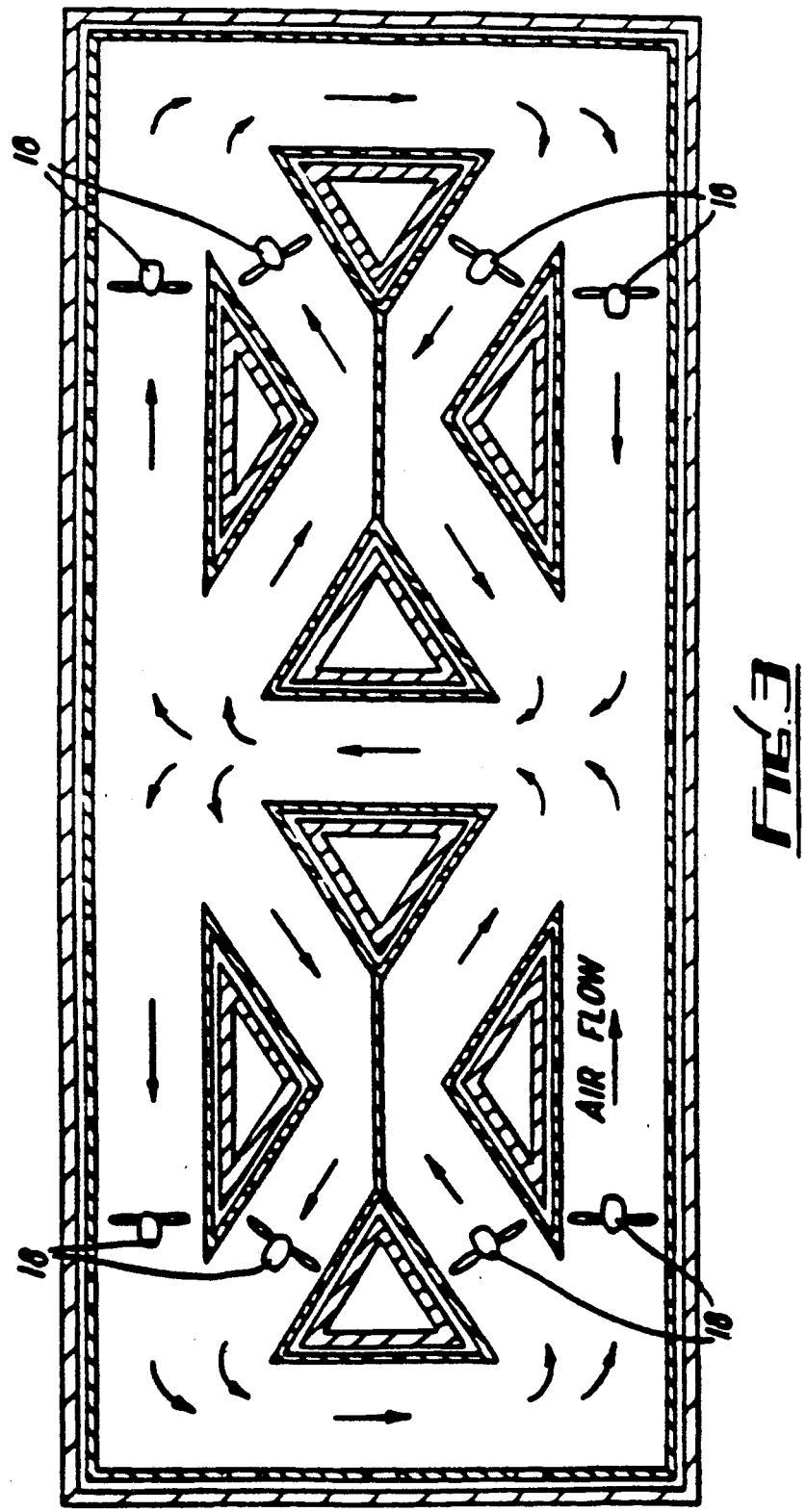

SUPPORT STRUCTURES

TECHNICAL FIELD

This invention relates to a guideway support base for use with high accuracy measuring and checking machines.

BACKGROUND ART

Heretofore for purposes of accuracy, it has been necessary to construct co-ordinate measuring machines using heavyweight material such as granite, i.e. material which remains as stable as possible with variations in temperature, by virtue of high thermal inertia, low thermal conductivity and low expansion coefficient. It has not been practical to use lightweight base structures with low thermal inertias where thermal expansion of the material could lead to distortion and loss of accuracy.

SUMMARY OF THE INVENTION

According to the present invention there is provided for use in a coordinate measuring machine, a guideway support base which can remain substantially stable through fluctuations in ambient temperature, characterised in that the support base comprises a plurality of interconnected elongate tubular elements which provide a relatively lightweight structure having a through passage, heating means provided in the passage, and means for controlling the heating means, the heating means and the control means being capable of maintaining the temperature of the support base at a level at or above the ambient temperature.

Preferably the heating means comprises one or more electrically heated strips which can be suspended centrally in the passage.

Preferably also the elongate tubular elements are connected together in a rectangular configuration.

The elongate tubular elements may be formed of steel or a granite composition material, and external insulation may be provided.

Fan means may be provided within the elongate tubular elements to move air therethrough and thereby assist in providing an even distribution of temperature throughout the apparatus.

BRIEF DESCRIPTION OF THE DRAWINGS

An embodiment of the present invention will now be described by way of example only with reference to the accompanying drawings, in which:

FIG. 1 is a diagrammatic perspective view of an apparatus according to the invention;

FIG. 2 is an enlarged section on 2222 of FIG. 1; and

FIG. 3 is a section on 3—3 of FIG. 2.

Referring to the drawing, a guideway base for use in a three axis co-ordinate measuring machine comprises a first pair of elongate tubular components 10 interconnected at their respective ends by a pair of tubular components 12 of reduced length whereby to define a rectangular configuration with a continuous passage therethrough. To reinforce the base an arrangement of elongate tubular struts 14 extend between inwardly facing external walls of the elements 10,12 in any suitable arrangement. The elements 10,12 and the struts 14 are formed of a material, preferably steel or a granite composite material comprising granite chippings and epoxy, which, in the tubular form, provides a lightweight base relative to a base formed of the material conventionally used, i.e. solid granite.

DETAILED DESCRIPTION OF THE INVENTION

To heat the base, a strip 16 incorporating one or more resistance wires is located within the elements 10,12 and the struts 14 to extend around the base. The strip 16 is preferably located centrally of the elements 10,12 by being suspended by arms 17 from side walls thereof, so as to avoid creating temperature gradients in the walls of the elements 10,12. The strip 16 is appropriately connected in an electrical circuit (not shown) for heating of the strip and thereby the base.

Additional heating strips may be used as necessary and in a modification the strip 16 may not extend around the whole base.

Within the base in the through passage there is provided a plurality of electrically operated fans 18. These effect circulation of the heated air throughout the base and thereby assist in providing a substantially uniform temperature throughout.

External insulation is provided for the elements 10,12 in order to avoid a temperature gradient across the walls. The insulation may be in a spaced relation with the external walls of the elements 10,12 to provide an air layer and it is envisaged that there may be provision for air to exit from the passage in the base into the spacing between the external walls and the insulation layer.

In use, the heating circuit controls the heating strip such that the temperature of the base structure is maintained at a constant level, at or above the ambient temperature. In this way changes in the ambient temperature do not result in any thermal expansion of the material of the base structure and therefore distortion and loss of measuring accuracy can be avoided.

Various modifications may be made without departing from the invention. For example the configuration of the base structure may differ from that described and shown and other suitable heating means may be provided internally of the elements. Also the structure may be formed of any other suitable material.

It is particularly suitable to use such a lightweight base structure with a three point support as described in our co-pending Application entitled "Support Assemblies" (Publications No. WO89/09676), a lightweight structure for the other components of the machine as described in our co-pending Application entitled "Machine Structure" (Publication No. WO89/0.9677), and a linear guideway as described in our co-pending Application entitled "Linear Guiding Apparatus" (Publication No. WO89/09887).

I claim:

1. A support apparatus for machines and the like, said support apparatus comprising a plurality of elongate tubular means interconnected to provide a substantially continuous passage therethrough, heating means located within said passage, and means for controlling said heating means, whereby the temperature of said support apparatus is maintained at or above the ambient temperature.

2. The support apparatus of claim 1, wherein said heating means comprises at least one electrically heated strip.

3. The support apparatus of claim 2, wherein said heated strip is located centrally within said passage.

4. The support apparatus of claims 1, 2, or 3, wherein said elongate tubular means are connected together in a rectangular configuration.

5. The support apparatus of claim 1, wherein said elongate means are formed of a lightweight material.

6. The support apparatus of claim 5, wherein said lightweight material comprises steel.

7. The support apparatus of claim 5, wherein said lightweight material comprises a granite composite material.

8. The support apparatus of claim 1, further comprising insulation provided external to said elongate tubular means.

9. The support apparatus of claim 1, further comprising means for circulating air through said passage to facilitate even distribution of temperature throughout said support apparatus.

10. The support apparatus of claim 1, further comprising tubular reinforcing struts having oppositely disposed ends, said struts connected adjacent their ends to said elongate tubular means.

11. A support apparatus for machines and the like, said support apparatus comprising a plurality of elongate tubular components having oppositely disposed ends, said tubular components interconnected with one another adjacent their respective ends to provide a continuous passage through said apparatus, heating means located within said passage, and means for controlling said heating means to maintain the temperature of said support apparatus at or above the ambient temperature.

12. The support apparatus of claim 1, wherein said heating means comprises at least one electrically heated strip.

13. The support apparatus of claim 12, wherein said heated strip is located centrally within said passage.

14. The support apparatus of claim 11, further comprising insulation provided external to said elongate tubular means.

15. The support apparatus of claim 11, wherein said controlling means further comprises means for circulating air through said passage to facilitate even distribution of temperature throughout said support apparatus.

16. The support apparatus of claim 11, further comprising tubular reinforcing struts having oppositely disposed ends, said struts connected adjacent their ends to said elongate tubular means.

17. An apparatus for supporting components of machines and the like, said apparatus comprising a plurality of elongate tubular components interconnected adjacent their respective oppositely disposed ends to provide a continuous passage through said apparatus, at least one tubular reinforcing strut having oppositely disposed strut ends connected to one or more elongate tubular components in fluid communication with said passage, heating means located within said passage, and means for controlling said heating means to maintain the temperature of said apparatus at or above the ambient temperature, said controlling means comprising at least one device for circulating fluid within said passage.

18. The apparatus of claim 17, wherein said circulating device comprises a fan for circulating air within said passage.

* * * * *

UNITED STATES PATENT AND TRADEMARK OFFICE
CERTIFICATE OF CORRECTION

PATENT NO. : 5,125,163
DATED : June 30, 1992
INVENTOR(S) : James Bury

It is certified that error appears in the above—identified patent and that said Letters Patent is hereby corrected as shown below:

Column 4 - Claim 12 - Line 1 - "claim 1" should be deleted and replaced with --claim 11--.

Signed and Sealed this

Twenty-eighth Day of September, 1993

Attest:

BRUCE LEHMAN

Attesting Officer      Commissioner of Patents and Trademarks